Dec. 20, 1927.
F. WESTERMAN
1,653,486
MACHINE FOR ICING CAKES
Filed April 3, 1922
11 Sheets-Sheet 1
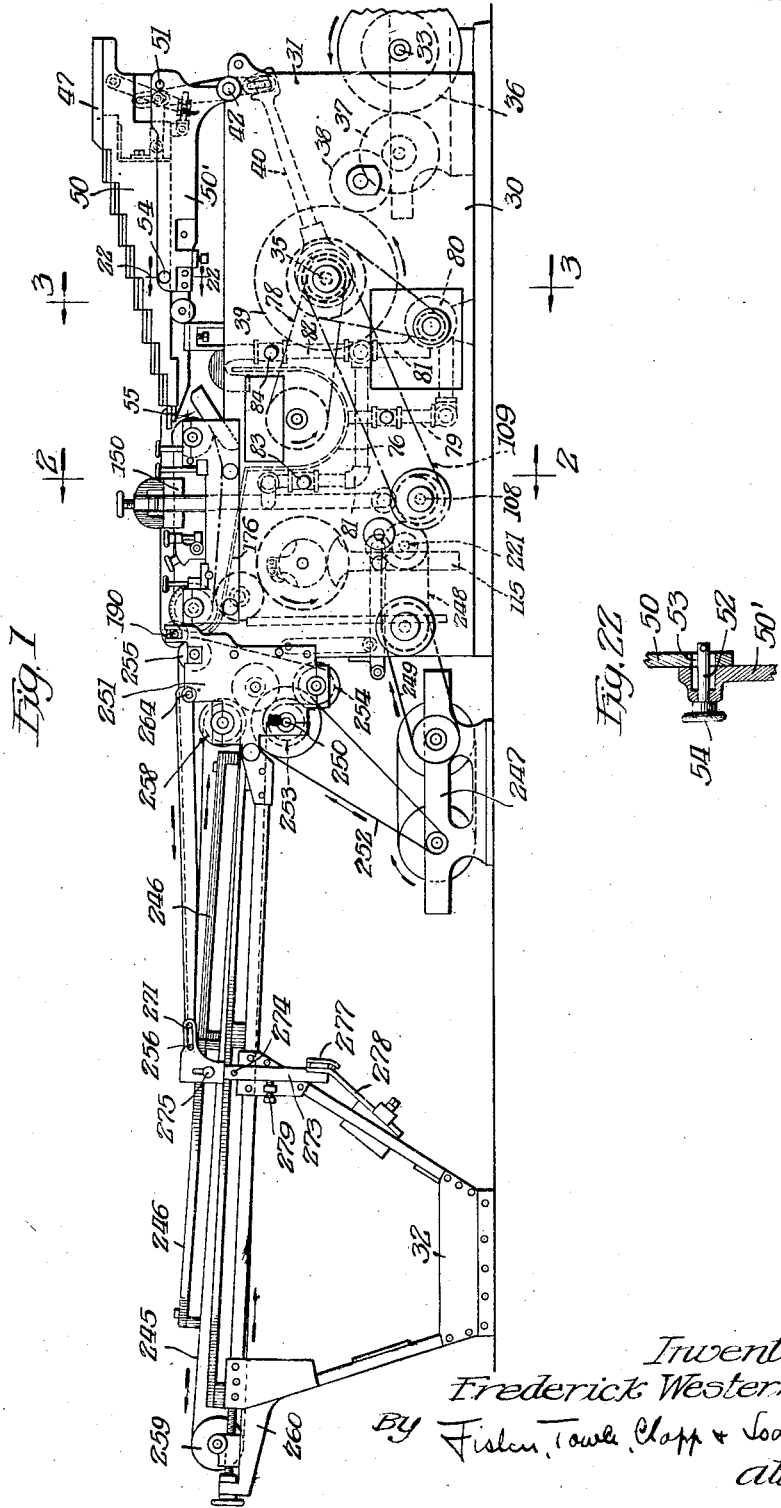
Inventor:
Frederick Westerman,
By Fisher, Towle, Clapp & Soans
attys Dec. 20, 1927.
F. WESTERMAN
MACHINE FOR ICING CAKES
Filed April 3, 1922     11 Sheets-Sheet 2
1,653,486
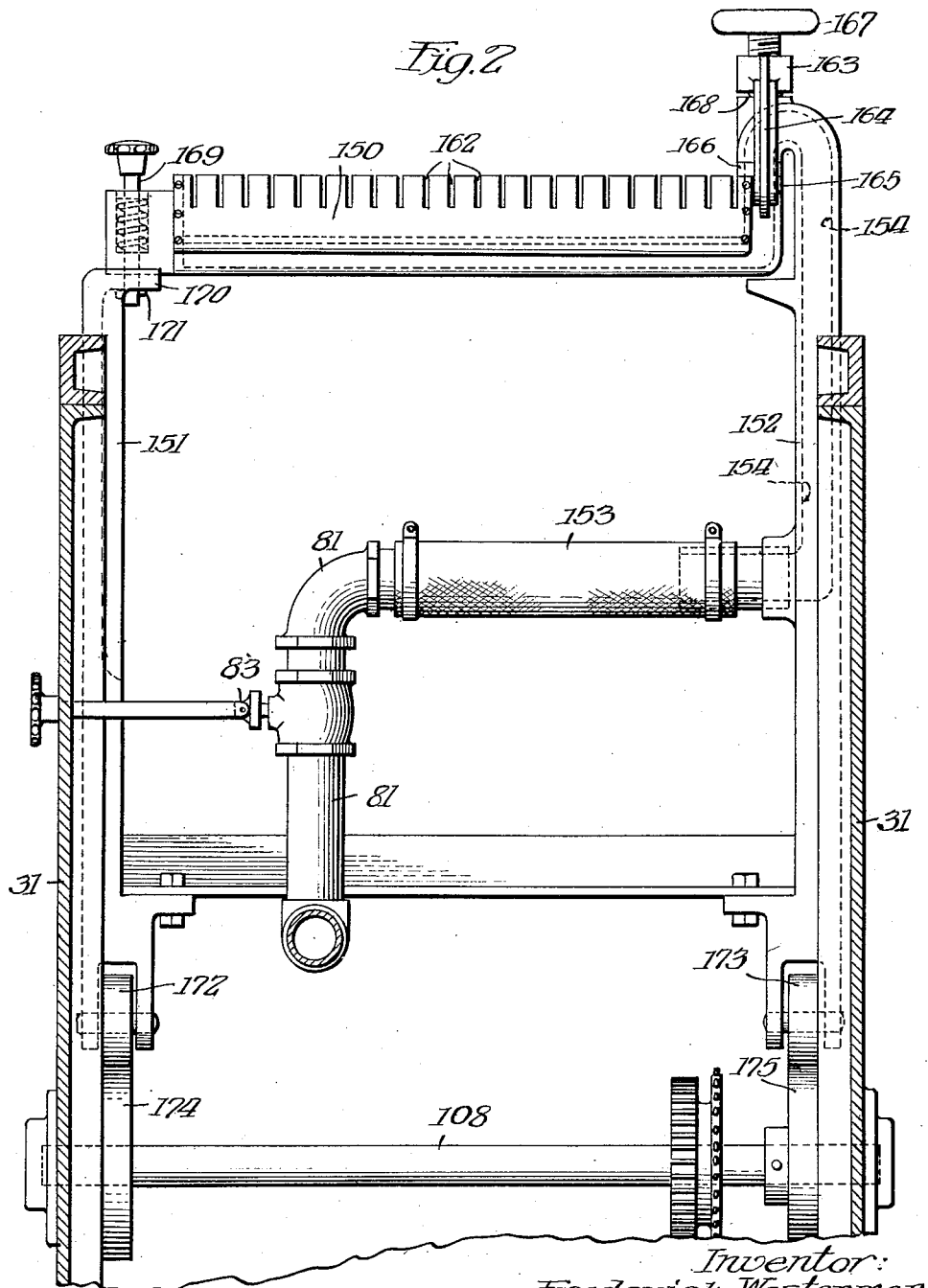

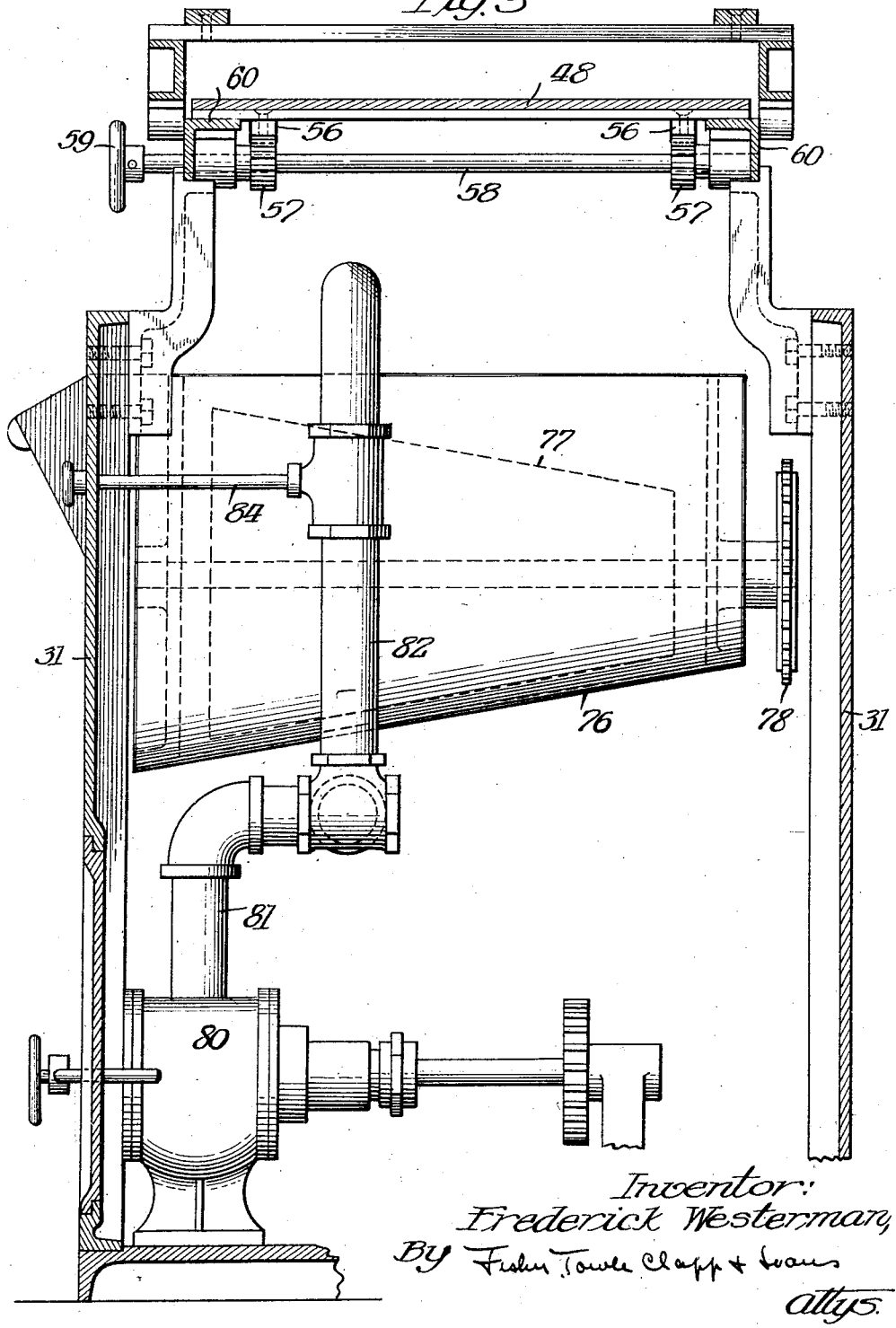

Dec. 20, 1927.
F. WESTERMAN
1,653,486
MACHINE FOR ICING CAKES
Filed April 3, 1922    11 Sheets-Sheet 4
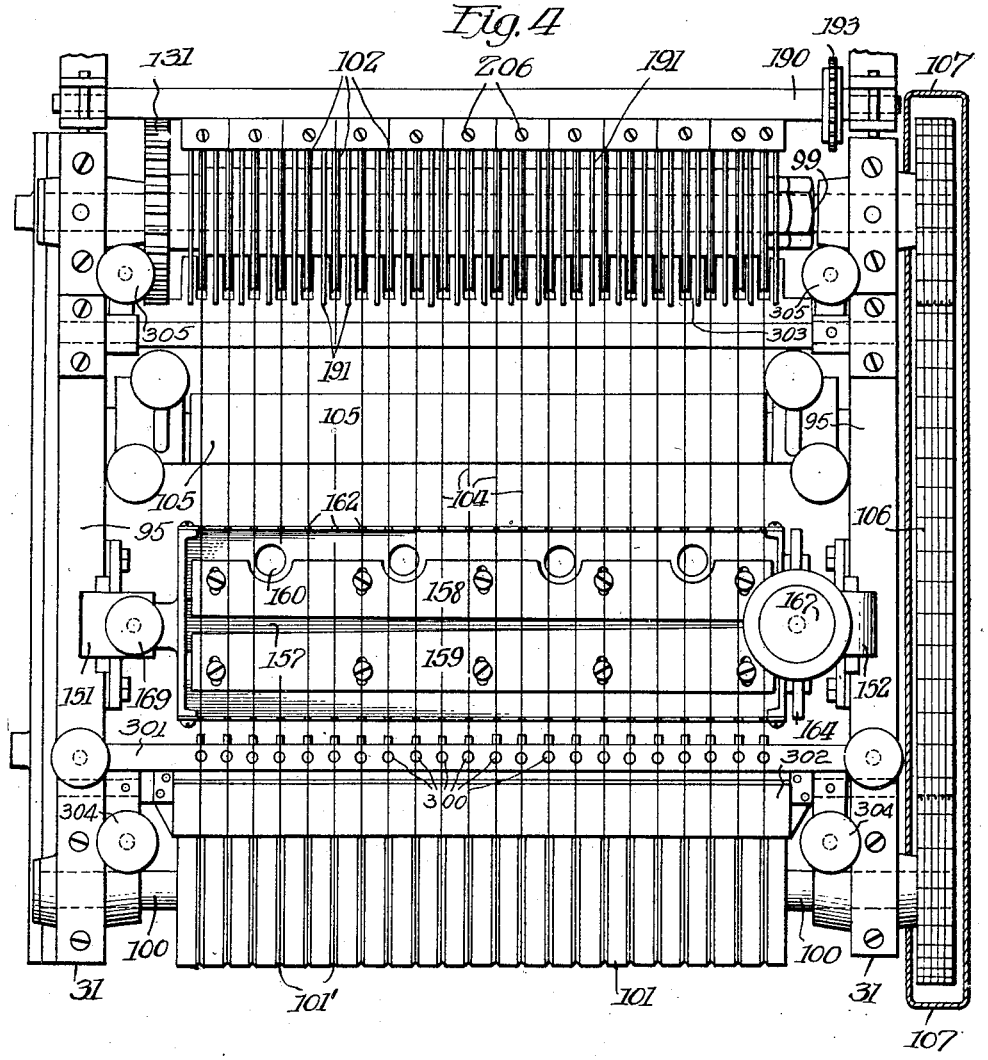
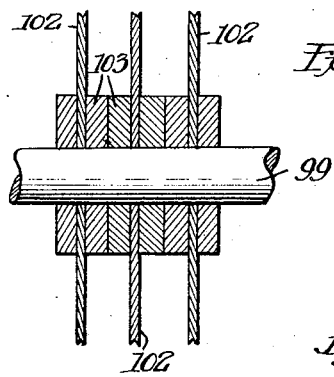
Inventor:
Frederick Westerman,
By Fisher, Towle, Clapp & Soans
attys.

Dec. 20, 1927.
F. WESTERMAN
1,653,486
MACHINE FOR ICING CAKES
Filed April 3, 1922     11 Sheets-Sheet 5
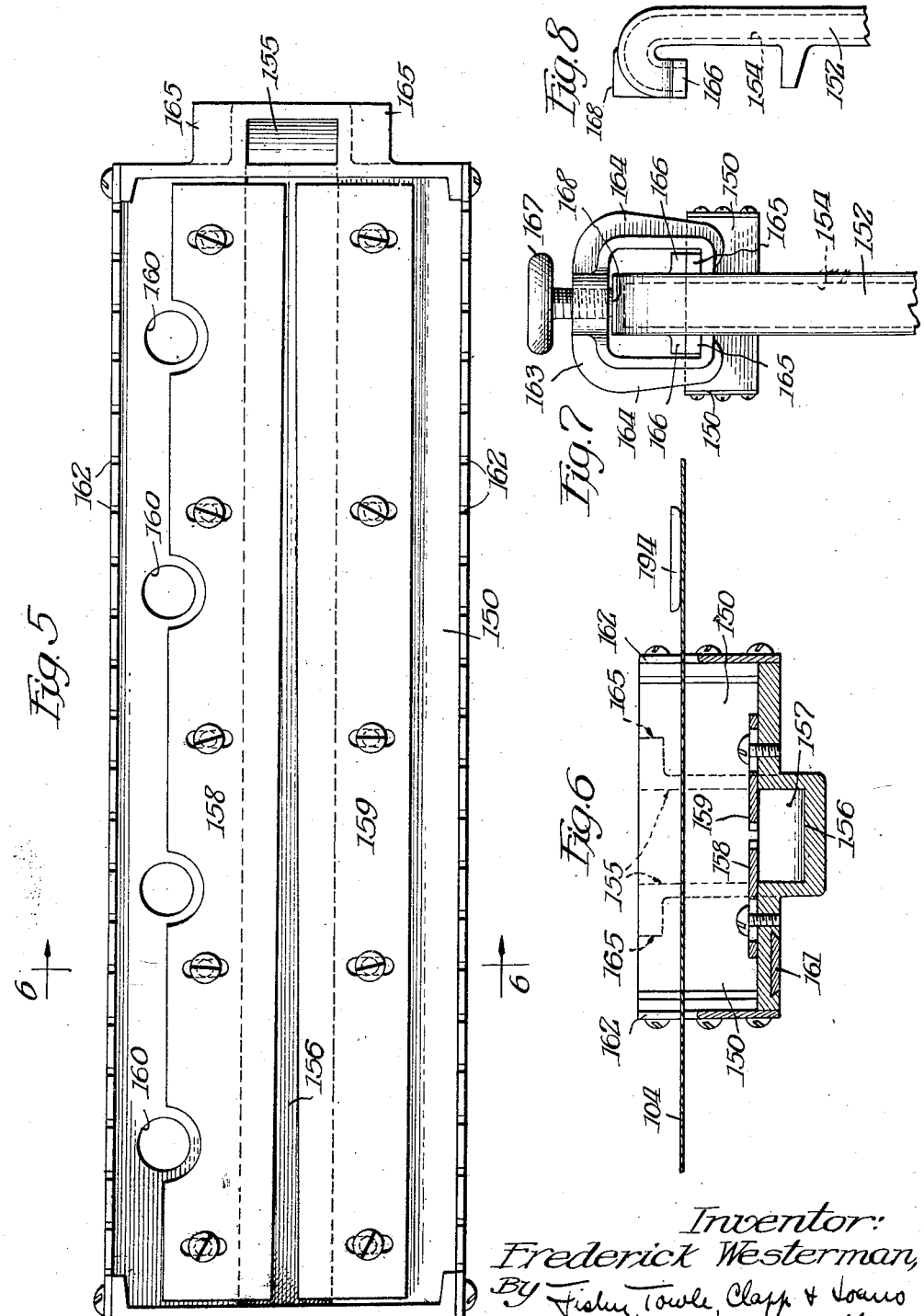

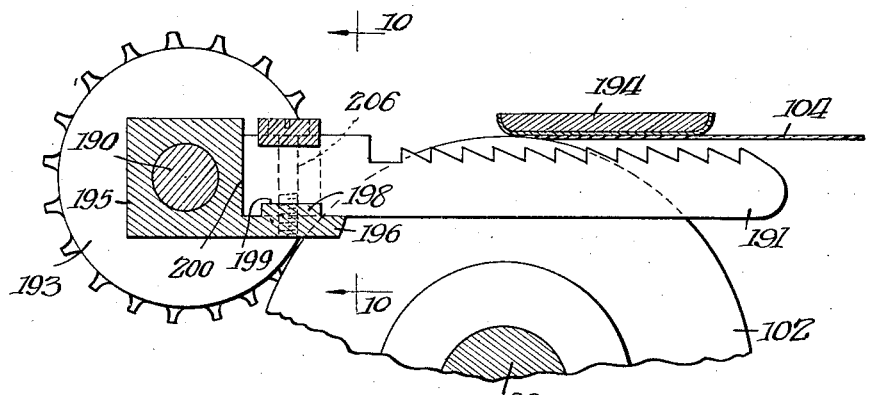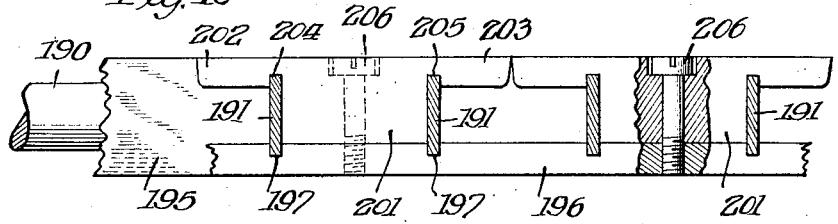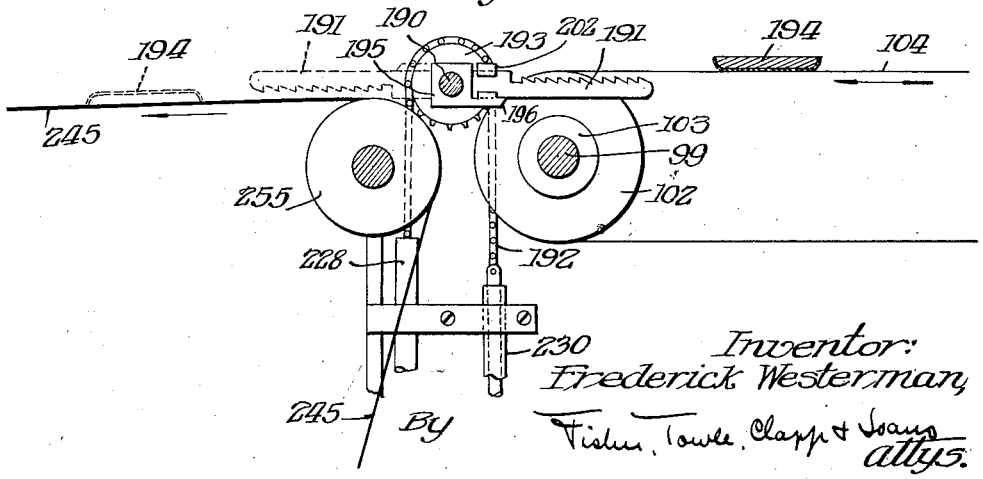

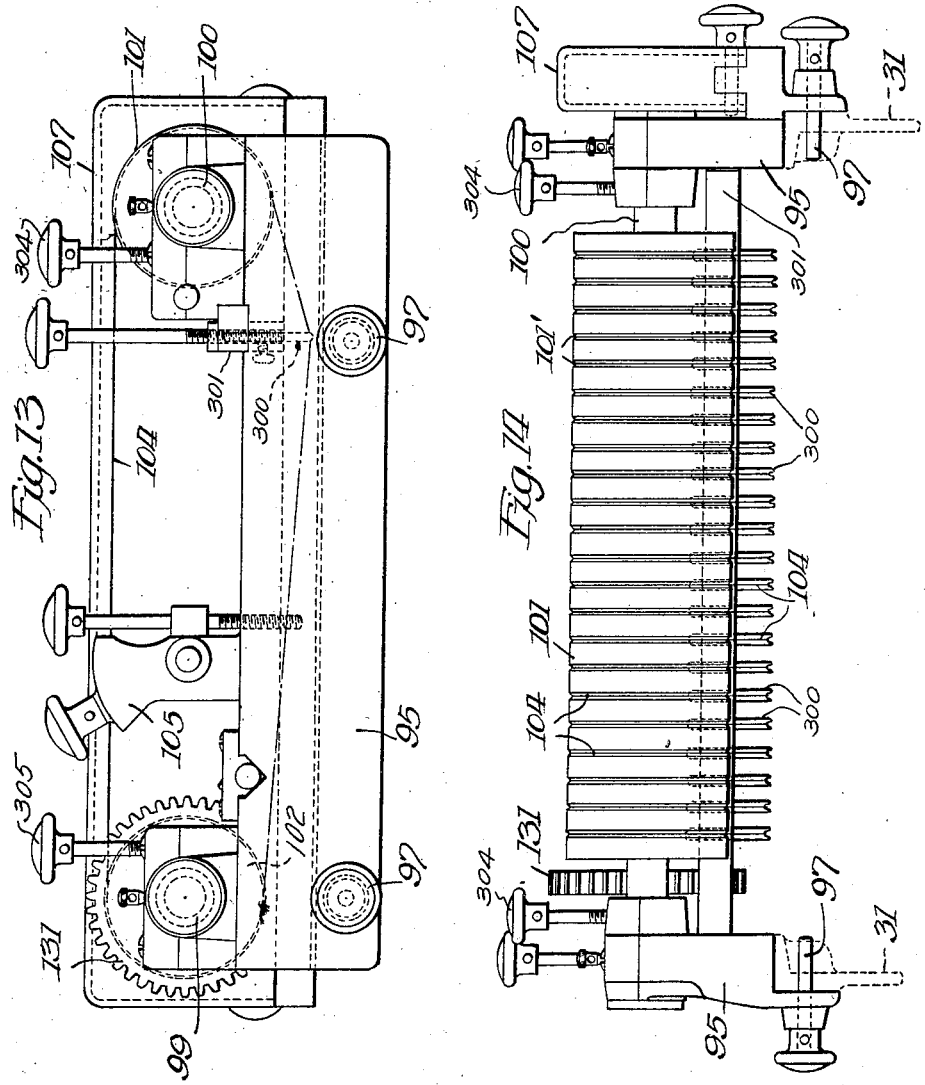

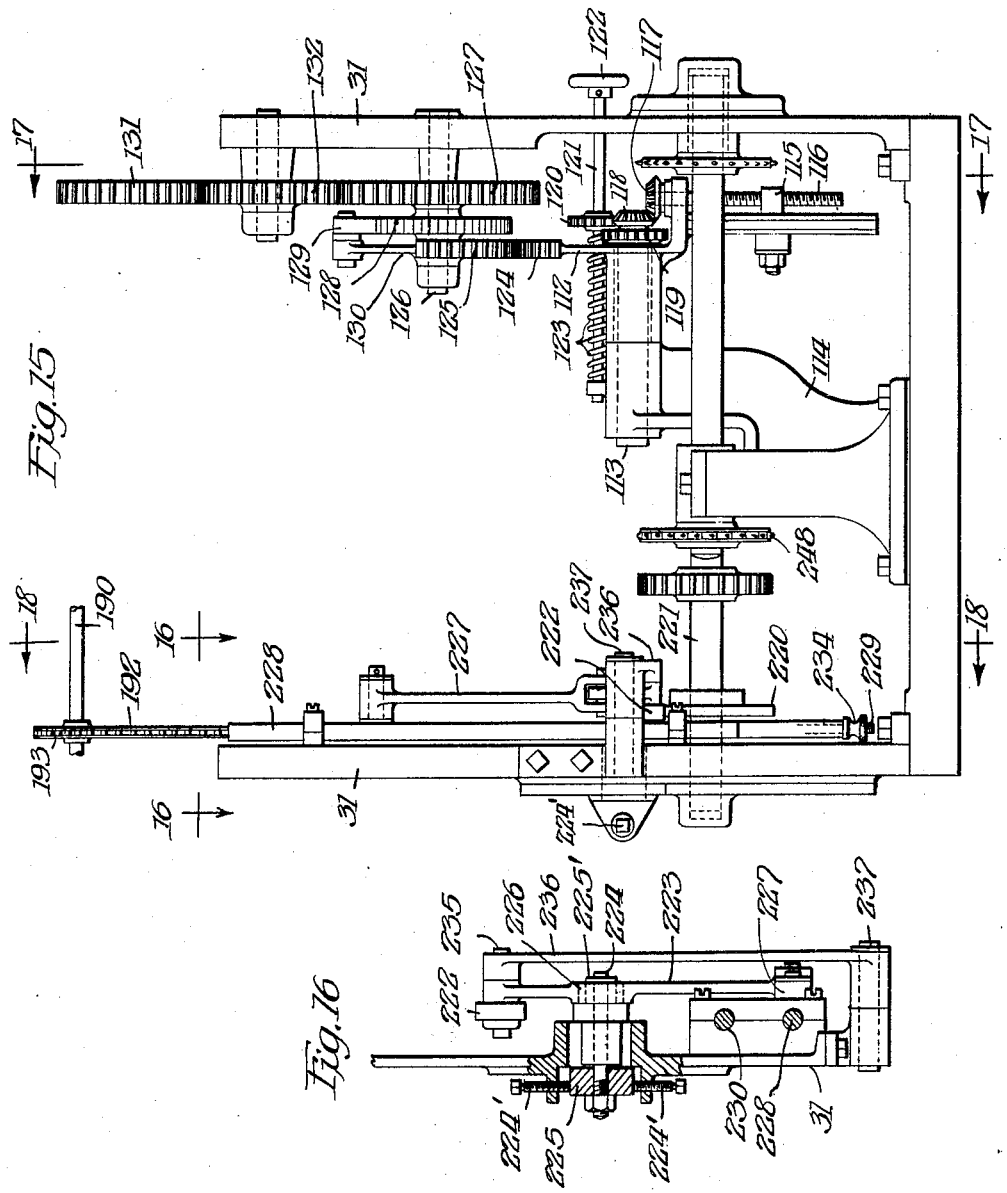

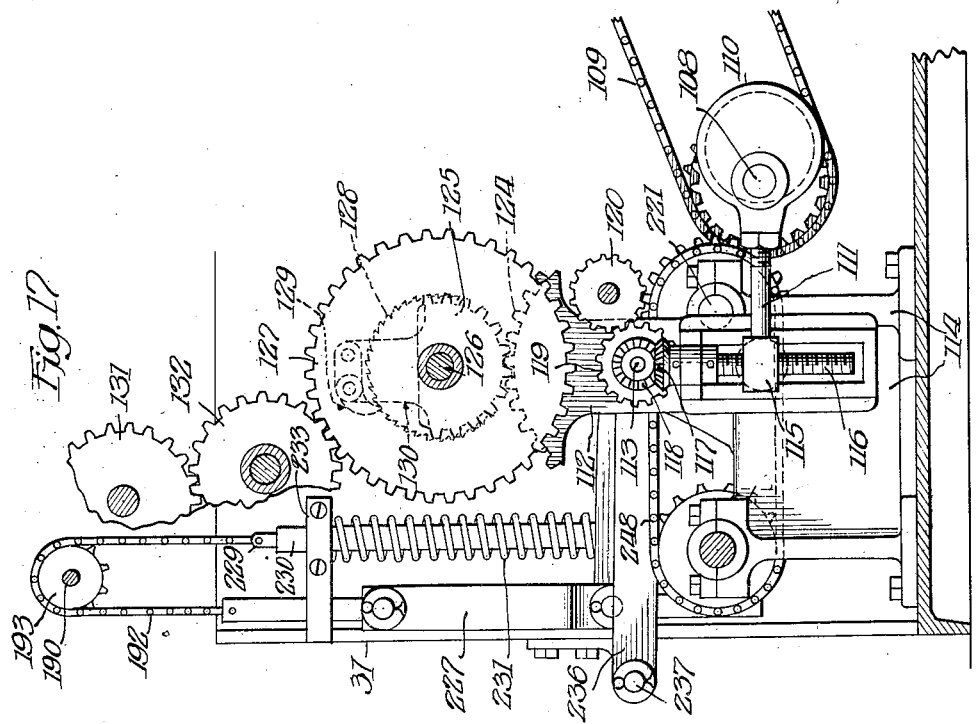

Dec. 20, 1927.
F. WESTERMAN
1,653,486
MACHINE FOR ICING CAKES
Filed April 3, 1922    11 Sheets-Sheet 10
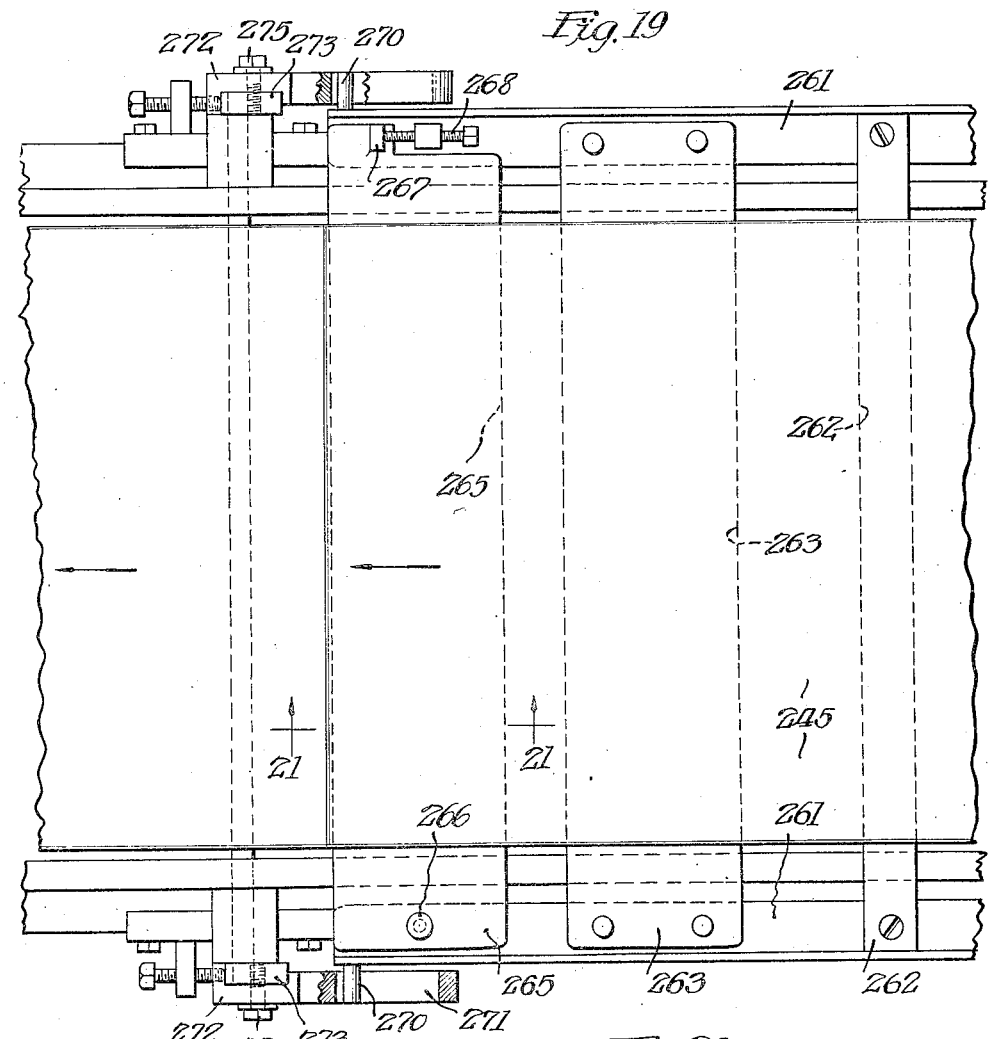
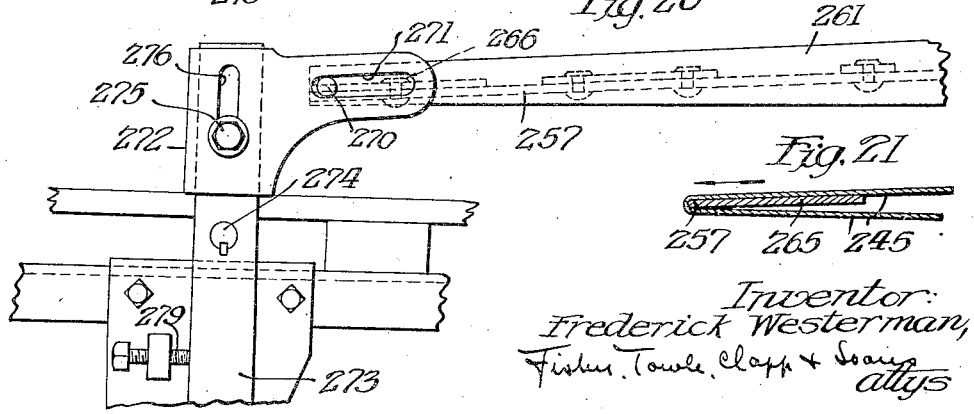
Inventor:
Frederick Westerman,
Fisher, Towle, Clapp & Soans
attys

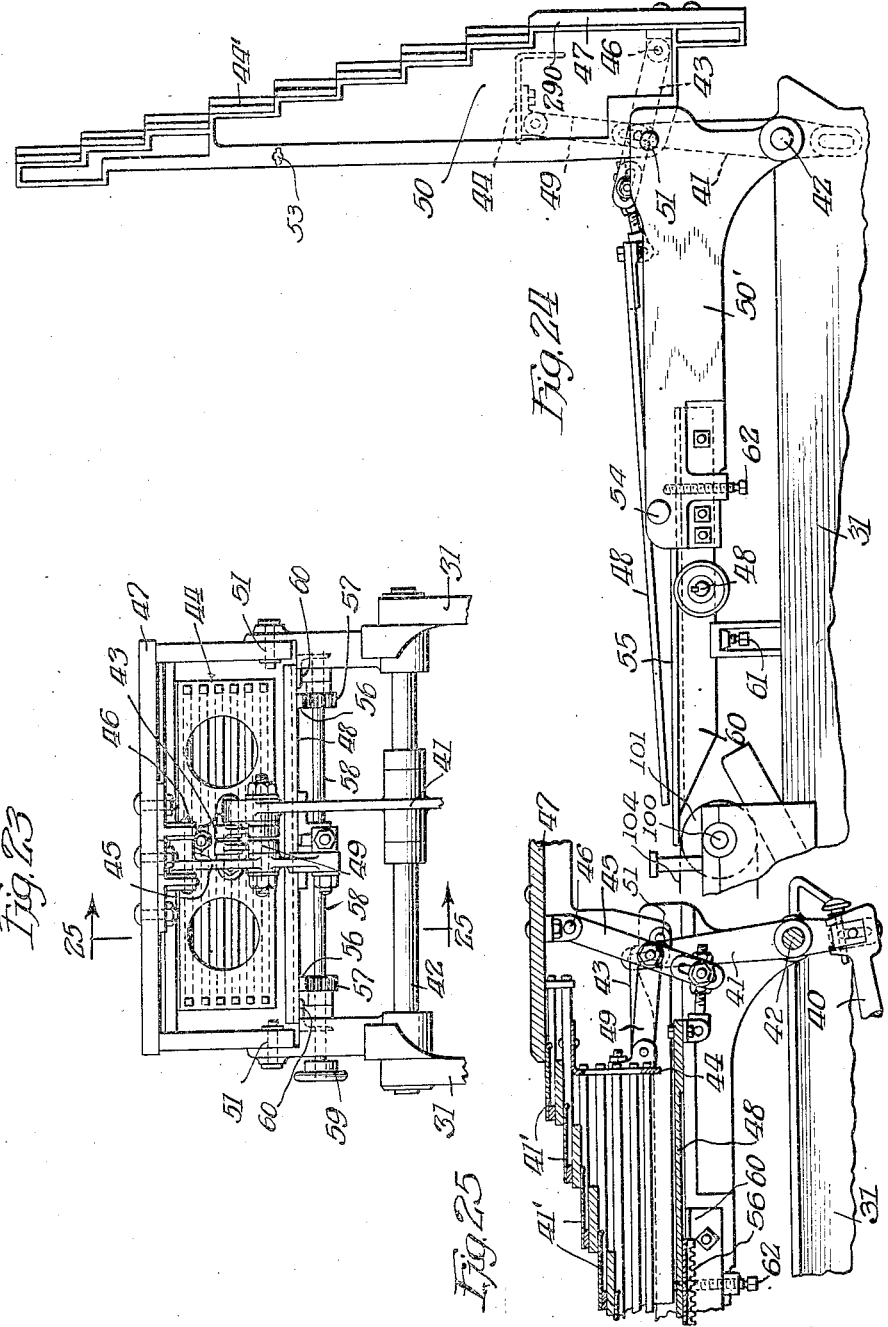

Patented Dec. 20, 1927.

1,653,486

UNITED STATES PATENT OFFICE.

FREDERICK WESTERMAN, OF CHICAGO, ILLINOIS.

MACHINE FOR ICING CAKES.

Application filed April 3, 1922. Serial No. 548,937.

This invention relates to machines for icing or coating cakes, wafers or other articles of a similar nature and has for its primary object to provide an improved icing mechanism and means for conducting the cakes to and from the same.

Further important objects of the invention are to provide an improved system of supplying the icing to the pan, to procure a more even distribution of the icing in the pan, to provide improved mechanism for inverting the iced cakes, to provide an improved apparatus for conducting the iced cakes from the icing mechanism, to provide improved operation of the conveyor in the icing mechanism, to facilitate cleaning of the icing mechanism, to provide an improved mounting for the pan, to provide means for adjusting the movement of the conveyor in the icing mechanism, to facilitate cleaning of the feed mechanism, and to provide means for adjusting the feed mechanism.

The many other objects and advantages of the invention will be better understood by reference to the following specification when considered in connection with the accompanying drawings illustrating a selected embodiment thereof, in which:—

Fig. 1 is a side elevation of the icing machine.

Fig. 2 is an enlarged vertical section on the line 2—2 of Fig. 1.

Fig. 3 is an enlarged vertical section on the line 3—3 of Fig. 1.

Fig. 4 is an enlarged plan view of the icing mechanism.

Fig. 5 is an enlarged detail plan view of the icing pan.

Fig. 6 is a vertical section on the line 6—6 of Fig. 5.

Fig. 7 is a detail end elevation of the icing pan and the support therefor.

Fig. 8 is a detail elevation of the upper portion of the icing pan support shown in Fig. 7.

Fig. 9 is a detail view of the inverting mechanism.

Fig. 10 is a vertical section on the line 10—10 of Fig. 9.

Fig. 11 is a diagrammatical view illustrating the method of inverting the iced cakes.

Fig. 12 is a detail sectional view of a portion of the icing mechanism.

Fig. 13 is a side elevation of the icing mechanism removed from the supporting frame.

Fig. 14 is an end view of the mechanism of Fig. 13.

Fig. 15 is an end elevation of the main frame or support with the discharging mechanism detached.

Fig. 16 is a horizontal section on the line 16—16 of Fig. 15.

Figs. 17 and 18 are vertical sections on the lines 17—17 and 18—18 respectively of Fig. 15.

Fig. 19 is an enlarged plan view of a portion of the discharging mechanism.

Fig. 20 is a side elevation of the mechanism shown in Fig. 19.

Fig. 21 is a detail sectional view of a portion of the discharge mechanism.

Fig. 22 is a detail view of the locking device for the feed mechanism.

Fig. 23 is an end elevation of the feeding mechanism.

Fig. 24 is a side elevation of the feed mechanism showing the upper section in raised position, and Fig. 25 is a vertical section on the line 25—25 of Fig. 23.

In the machine embodying my invention, feed mechanism is provided to conduct the cakes to the icing mechanism where they are dipped in a mass of icing and delivered to the discharging mechanism. The particular type of feed mechanism which I prefer to use is similar to that shown and described in reissue patent of the United States No. 13,999, granted to me on October 19, 1915, and reference may be had thereto for a more full description thereof.

Referring to the drawings, the base of frame 30 comprises oppositely disposed vertical plates 31 which support the mechanism and keep the icing from splashing on the operators or on the floor. A support 32 is provided for the outer end portion of the discharge mechanism. The machine is operated by a driving shaft 33 which is connected to some suitable source of power and a shaft 35 is driven therefrom through the medium of the gears 36, 37, 38 and 39. The feed mechanism is actuated by an eccentric rod 40 from the shaft 35. The outer end of this rod is connected to the lower end of a lever 41 pivotally mounted intermediate its ends on the shaft 42 supported by the base 30. The upper slotted end of the lever 41 is connected by a link 43 to the frame 44 carrying the movable steps 44'. A lever 45 is fulcrumed at 46 on the frame 47 of the upper section of the feed mechanism. The lower end of this lever 45 is adjustably linked to the rear edge of the independently movable step 48 of the feed mechanism. The frame 44 is connected to the lever 45 by a link 49. The feed mechanism in the present embodiment comprises an upper section 50 and a lower section 50'. The upper section is hingedly mounted on the lower section at 51 to permit the former to be raised independently of the latter, as indicated in Fig. 24. A pin 52 is provided to lock the sections together. This pin is adapted to be pressed forwardly through the slot 53 in the frame of the upper section and then rotated to locking position by the operating handle or knob 54. The lower section 50' is hingedly mounted upon the shaft 42 so that both sections may be raised together. The sections are normally locked together and are only unlocked when the upper section is to be raised independently. The reciprocation of the frame carrying the upper movable steps causes a corresponding reciprocation in the lower step 48.

Beneath the forward end of the lower movable step 48 is a plate 55 supported by the frame of the lower section of the feed mechanism and slidable thereon to vary the point of discharge of the cakes upon the conveyor in the icing mechanism. Racks 56 on the underside of this plate are adapted to be actuated by corresponding pinions 57 on a shaft 58 to provide this adjustment. The shaft 58 is operated manually by a handpiece 59. The plate 55 forms a support for the forward portion of the step 48 but the rear portion of this step rests on the angle irons 60 of the section and is slidable thereon. The forward portion of the lower section of the feed mechanism rests on adjusting screws 61 The upper section similarly rests on adjusting screws 62 in the lower section which permit the position of this section to be adjusted for cakes of different thickness.

The supply of icing for the machine is held in a receptacle 76 supported by the base 30, and this receptacle is preferably provided with an agitator 77 of suitable form which is operated by a chain 78 from the shaft 35. An out-flow pipe 79 connects the bottom of the receptacle with a feed pump 80 and a pipe 81 conveys the icing from this pump. A return pipe 82 leads from the pipe 81 to a point above the top of the receptacle 76. Control valves 83 and 84 of any suitable type are placed in the pipes 81 and 82 respectively.

In order to facilitate cleaning and adjustment of the parts, the conveyor of the icing mechanism is formed in a unit which may be lifted from the base en masse. This unit (Figs. 13 and 14) has oppositely disposed end frames 95 which rest upon the corresponding side plates 31 of the base and are secured thereto by pins 97 in the manner indicated. Parallel shafts 99 and 100 are revolubly mounted in suitable bearings in the plates 95. A long pulley 101 on the shaft 100 has a plurality of parallel peripheral grooves 101' formed therein. A disk pulley 102 is secured on the shaft 99 opposite each of the grooves 101' in the pulley 101 and spacing members 103 (Fig. 12) maintain these disks at the proper interval. An endless thread or wire passes about each of the pulleys 102 and the corresponding groove 101', and these form the endless conveyor 104. The periphery of each of the pulleys 102 is preferably grooved to prevent the conveyor thread from becoming detached therefrom. Means for maintaining the conveyor taut comprises a plurality of pins 300 adjustably mounted in a cross bar 301 which is removably secured to the side frames 95—95 of the conveyor unit. An adjustable scraper 105 is provided in the icing unit to remove surplus icing from the bottom of the cakes which are carried thereover by the conveyor. Scrapers indicated at 302 and 303 are provided for scraping icing from the roll 101 and pulleys 102 respectively. Means, preferably including easily accessible devices such as screws 304 and 305 are provided for effecting adjustment of the scrapers relative to the respective roll and pulleys. A driving chain 106 connects the shafts 99 and 100 and is enclosed in suitable housing 107. This is particularly advantageous as it insures a uniform rotation of these shafts and removes all strain from the threads of the conveyor 104.

A shaft 108 (Fig. 17) is supported in suitable bearings in the base of the machine and is driven from the shaft 35 by a chain 109. An eccentric 110 is secured upon the shaft 108 and the eccentric rod 111 is connected to the lower portion of an oscillating bar 112 pivotally mounted intermediate its end on the stud shaft 113 in the support 114 (Fig. 15). In order to adjust the throw of the bar 112, the eccentric rod 111 is connected to a threaded sleeve 115 which fits on a correspondingly threaded rod 116 carried by the bar 112. The upper end of this rod 116 is provided with a beveled gear 117 which is adapted to be operated by a corresponding gear 118 secured on the reduced outer end of the shaft 113. A gear 120 on the longitudinally slidable rod 121 is adapted to be moved into mesh with a gear 119 on the shaft 113 so that manual rotation of this rod will cause the sleeve 115 to be raised or lowered upon the rod 116. A spring 123 about the rod 121 causes the gear 120 to be disengaged from the gear 119 as soon as the handle 122 is released. The shifting of the sleeve 115 on the rod 116 increases or decreases the extent and therefore the rapidity of the rocking movement of the bar 112 under the action of the eccentric 110.

A segmental gear 124 on the upper end of the bar 112 meshes with a like gear 125 on the stud shaft 126 to provide an oscillating movement to this shaft. A gear 127 free on the shaft 126 carries a ratchet wheel 128 which is actuated by a pawl 129 on a radial arm 130 on the gear 125. This mechanism imparts to the gear 128 an intermittent rotation in one direction. The gear 127 actuates the gear 131 through the medium of an idler gear 132. The gear 131 is secured upon the shaft 99 and forms the driving means for the conveyor in the icing mechanism. It is therefore obvious that the threads 104 are provided with an intermittent advance which may be varied by adjusting the throw of the bar 112 in the manner described.

The icing is applied to the cakes in a dipping pan 150, which receives its supply from the receptacle 76. This pan 150 is supported at its opposite ends by upright members 151 and 152 which are vertically slidable in the base. The icing is conveyed to the dipping pan 150 from the pipe 81 through a flexible tube 153 and a passage 154 in the supporting member 152. The upper end of the member 152 is turned over to register with the upper end of a passage 155 in the end wall of the pan 150. A longitudinal channel 156 is formed in the base of the pan 150 and the icing enters this channel from the passage 155 through the port 157, registering with the end thereof. Adjustable plates 158 and 159 are secured by screws or other suitable means to the pan 150 to project over the channel 156 in the manner indicated for the purpose of regulating the admission of icing to the pan. These plates should be nearer together at the end of the channel next to the passage 155 and gradually spreading toward the opposite end in the manner indicated in Fig. 5. The entrance of the icing at one end of the pan would naturally tend to cause a surplus to accumulate at this end as the icing is of thick consistency and flows slowly, but by admitting the same through an opening extending practically the entire length of the base, narrow at the point of greatest pressure and gradually widening as the pressure decreases, a uniform level is maintained. In order to drain the pan 150 at any time, I have provided a series of openings 160 in the bottom which are normally closed by a slide 161 supported in suitable guides on the bottom of the pan. The sides of the pan have opposite slits or notches 162 which are arranged to permit the passage of the threads or wires of the conveyor 104 therethrough when the pan is lifted to apply the icing to the cakes.

The pan 150 is secured to the support 152 by a clamp 163 having oppositely disposed hook arms 164 which pass downwardly under lugs 165 formed on the end of the pan 150 to hold these lugs against corresponding lugs 166 on the inverted end of the support 152. This clamp is operated by a screw 167 acting against the upper end 168 of the support 152. The opposite end of the pan rests on the upper end of the support 151 and is adapted to be locked thereto by a spring pin 169 which is pressed downwardly through a slot in the inturned end 170 and then rotated to move the pin 171 out of registration with the slot. The clamp 163 is particularly advantageous, not only in providing a firm support for the end of the pan, but in forming a tight joint between the passages 154 and 155, so that no leakage of icing may occur. Rolls 172 and 173 are provided in the lower ends of the supports 151 and 152 respectively to engage corresponding actuating cams 174 and 175 on the cross shaft 108. These cams lift the pan into operative position and maintain it in this position a sufficient period to permit the icing to adhere to the row of cakes in icing position on the conveyor 104. The pan is preferably lowered by the cams 174 and 175 prior to the forward movement of the cakes on the conveyor. Any excess icing dropping from the cakes or removed therefrom by the scrapers is conducted to the receptacle by inclined plates 176. The feeding of icing to the pan is regulated by the valves 83 and 84 in the pipes 81 and 82. When an excess of icing is being provided the valve 83 may be partially shut and the valve 84 proportionally opened. This permits a certain amount of the icing to pass upwardly in the pipe 82 and be returned to the receptacle 76.

The cakes rest on the conveyor 104 with the iced side down and, in order that they may be inverted before being placed upon the drying apparatus, I have provided a transverse shaft 190 which carries a plurality of parallel knives 191, one knife being disposed between each pair of disk pulleys 102 in the manner indicated in Fig. 4 of the drawings. This shaft 190 is supported in suitable bearings in the end of the frame of the icing unit and is given an oscillating motion by a chain 192 passing over the sprocket 193. This shaft with the knives attached is shown in detail in Figs. 9 and 11, in which the knives in receiving position are indicated by solid lines. The position of discharge is indicated by dotted lines in Fig. 11. A long block 195 substantially square in cross section fits on the shaft 190 and is secured thereto. This block is provided with a flange 196 which is grooved as indicated at 197 to receive each of the knives 191. A longitudinal rib 198 is formed on the upper face of the flange 196 to fit in corresponding grooves 199 in the knives in the manner indicated in Fig. 9. The knives are secured in place upon the bar or holder 195 by means of a series of blocks 201, each of which engages two knives. These blocks are provided with laterally projecting flanges 202 and 203 which overlie the upper edge of the corresponding knife and are provided with grooves 204 and 205 similar to the grooves 197 and for the same purpose. Binding screws 206 pass through the blocks. This form of knife mounting insures that the knives are rigidly held in position and facilitates their removal for repair or replacement. In order to prevent the cakes from slipping from the knives under the action of centrifugal force, I have found it advantageous to serrate the blade in the manner indicated.

The oscillating movement of the shaft 190 (Figs. 17 and 18) carrying the knives 191 is provided by a cam 220 on the transverse shaft 221 (Fig. 15) coacting with a roller 222 on a rock lever 223 pivotally mounted on a stud shaft 224. The stud shaft 224 is mounted in an adjustable block 225 held by adjusting screws 224'. A block 225' is revoluble on the outer end of the shaft 224 and slidable in the longitudinal slot 226 in the lever 223. Adjustment of the block 225 in the frame shifts the fulcrum point of the lever 223 and increases or decreases the throw of the knives. The lever 223 is connected by a link 227 to the vertically slidable rod 228 which has its upper extremity connected to one end of the sprocket chain 192. The opposite end of this chain is connected to the upper end of an adjusting screw 229 passing through the axial bore of a vertically slidable rod 230 and is provided at its end with an adjusting nut 234. A spring 231 envelops the rod 230 and acts between a collar 232 secured thereon and the supporting bracket 233 so that the rod is normally yieldingly held in its lowermost position. Adjustment of the position of the knives is procured by the nut 234 on the lower end of the screw 229. The pin 235 carrying the roller 222 is also connected to the base by a link 236. When the roller 222 is lifted by the conformation of the cam 220, the rod 228 is depressed by the lever 223, causing the sprocket wheel 193 to be rotated in a counterclockwise direction (Figs. 11 and 18) and the knives 191 moved from the position indicated in solid lines to the dotted position (Fig. 11).

When the cakes are lifted by the knives 191 in the manner described, they are deposited with the iced side up upon a discharge conveyor 245 which in the present embodiment conducts them to drying boards 246. This discharge conveyor is actuated by a change speed mechanism 247 which is driven from the shaft 221 through the medium of the chains 248 and 249. A shaft 250 is mounted in a bracket 251 on the discharge end of the base 30 and this shaft is operated by a chain 252 from the change speed mechanism 247. A pulley 253 on the shaft 250 forms the driving means for the endless belt conveyor 245. This belt passes over the pulley 253, under the pulley 254, over the pulley 255, around the end 256 of a hinged frame 257, (Figs. 20 and 21) over and under the pulley 258, over and under the pulley 259 and back to the place of beginning. The direction of the belt is indicated in Fig. 1 by arrows. The pulleys 253, 254, 255 and 258 are supported in the bracket 251. The pulley 259 is adjustably mounted in the outer end 260 of the support 32 and is adapted to regulate the tension of the belt 245.

The frame 257 comprises side members 261 which are connected by cross members 262 and 263. The inner ends of these members 261 are pivotally mounted at 264 on the bracket 251 so that the frame may swing in a vertical plane. A cross-piece 265 is pivotally mounted on one of the members 261 at 266, and its opposite end is provided with an upturned lug 267 which abuts against the end of an adjusting screw 268 (Fig. 19) on the frame. This member 265 forms the end of the frame 257 and its edge is preferably rounded to facilitate the movement of the belt thereover (Fig. 21). The member 265 may be trued by the adjusting screw 268 to insure the proper tracking of the belt. Pins 270 on the outer end portions of the frame members 261 enter slots 271 in the supporting frames 272. These frames 272 are secured upon the upper portion of levers 273 which are pivoted at 274 on the supports 32. The stud bolts 275 securing the frames 272 to the corresponding levers 273 pass through slots 276 in these frames, which permit a limited relative movement of these parts. The lower ends of the levers 273 are connected by cross piece 277 which carries a counter-weighted arm 278. A swinging movement of the lever 273 in a counterclockwise direction (Fig. 20) causes the outer end of the frame 257 to be slightly lifted. The normal height of the outer end of this frame is determined by adjusting screws 279 which limit the movement of the levers 273 in one direction. With the disposition of pulleys described, the belt 245 is practically doubled back upon itself to form two conveyors, one conducting the cakes from the icing mechanism to the drying boards, and the other advancing these boards to receive the cakes. This construction is particularly advantageous as it insures that both of these conveyors are operating at the same speed. A drying board is placed upon the belt 245 beneath the frame 257 by sliding it transversely thereof. As soon as one board has been advanced by the belt sufficiently to permit, another may be placed on the belt immediately in rear thereof so that a succession of boards is passing beneath the cross-piece 265 to receive the rows of cakes as they are discharged by the conveyor 245. The cross-piece 265 is preferably of comparatively thin material and disposed by the adjusting screws 279 very slightly above the top of the drying boards so that the cakes pass easily from the conveyor to the boards. This is a very distinctive improvement over my earlier construction in which the cakes and the drying boards were advanced on different conveyors.

In the operation of the machine, the cakes are deposited indiscriminately on the fixed upper step 290 on the frame 50, from which they are moved forwardly step by step. During this movement the cakes are arranged in rows which are deposited successively upon the conveyor 104 of the icing mechanism. The lower step 55 is adjusted so that the depositing of the cakes on the conveyor 104 will occur at the proper place to bring this row of cakes substantially over the middle of the dipping pan at the termination of the first advance of this conveyor. During the period of rest of the conveyor 104, the dipping pan 150 is lifted by the cams 174 and 175 so that the threads of the conveyor enter the notches 162 and the cakes are lifted by the icing from the threads or wires of the conveyor. The icing pan is then lowered by the cams and the iced cakes are redeposited on the conveyor. The conveyor now advances carrying the cakes past the scraper 105 which removes any surplus icing. The next advance of the conveyor brings the cakes over the knives 191 in the position indicated in Fig. 9. The shaft 190 is given a half rotation which causes the knives to lift the row of cakes from the conveyor 104 and deposit them in an inverted position on the conveyor 245 in the manner indicated in Fig. 11. The serrated edge of each of the knives engages the iced underface of the cakes and thus prevents the cakes from flying off under the action of centrifugal force during the inverting operation.

The plates 159 in the pan 150 should be carefully adjusted so that a uniform level of the icing is maintained in the pan slightly below the upper edge thereof. If the icing is entering the pan more rapidly than it is being removed by the cakes the valve 83 should be partially closed and the valve 84 similarly opened so that a sufficient portion of the icing will pass upwardly through the pipe 82 and be returned to the supply receptacle 76. With a proper adjustment of these valves the icing should be maintained at a constant level in the pan.

The conveyor 245 operates by a continuous movement so that one row of iced cakes has advanced sufficiently thereon before the next is presented thereto. The rows of cakes are deposited upon the drying boards with like uniformity and each board is removed as soon as it has been filled. The entire operation of the machine is exceedingly simple and practically requires no attention from the time the cakes are deposited upon the feeding mechanism until the drying boards are removed from the conveyor. When once adjusted the operation will continue indefinitely on the same type of cake.

In the cleaning of the machine at the completion of the operation the icing pan is first removed by disengaging the pin 169 and loosening the clamp 163 sufficiently to permit the pan to be withdrawn endwise. The feeding mechanism is next swung upon the shaft 42 into a vertical position. The icing unit may now be removed by disengaging the pins 97 and lifting the unit from the base. This is particularly advantageous as it not only permits the parts of the icing unit to be easily cleaned but it exposes the parts below the icing unit and particularly the inclined plates 176 which necessarily become covered with the icing. The removal of the icing unit and the lifting of the feed unit renders the icing receptacle 76 accessible and permits the parts of the machine connected therewith to be easily cleaned. The feeding mechanism can be most easily cleaned by lifting the upper frame 50 in the manner indicated in Fig. 24, as this exposes the parts most advantageously.

It is obvious that instead of depositing the cakes on drying boards or trays in the manner described, the discharging conveyor may be extended to form a dryer or the cakes may be delivered by this conveyor upon any other well known form of drying apparatus.

The entire machine is designed for continuous operation and is simple in construction, rapid in action, efficient in operation and easily cleaned. It may be used to ice practically any form of cakes or wafers and all adjustments may be easily made while the machine is running. The icing is maintained at a constant level in the icing pan and is fed thereto from a supply receptacle in which it is being constantly stirred to maintain it in proper emulsion. The speed of the discharging conveyor may be readily adjusted while the machine is operating to secure any desired spacing of the rows of cakes thereon. The moving parts are well protected to prevent accidents and to keep the icing from splashing upon the operator or on the floor. The entire machine is easily cleaned.

While I have shown and described my invention in a preferred form, I am aware that many changes and modifications may be made without departing from the spirit of the invention, and I reserve the right to make all such as fairly fall within the scope of the following claims.

I claim as my invention:

1. In a machine of the class described, the combination with icing mechanism, of mechanism for feeding cakes to said icing mechanism, a series of alternately arranged relatively fixed and reciprocating steps for delivering cakes to said cake feeding mechanism, and means for adjusting the lowermost fixed step to vary the position of discharge of the cakes longitudinally upon said cake feeding mechanism.

2. In a machine of the class described, a base, and feed mechanism mounted on said base comprising a lower frame hingedly mounted on said base, an upper frame hingedly mounted on said lower frame, a series of alternately arranged relatively stationary and reciprocating steps on said upper frame, a horizontally adjustable stationary step on said lower frame to receive the cakes from the steps on the upper frame, and means for discharging the cakes from said adjustable step.

3. In a machine of the class described, an icing pan, means for supplying icing to said pan through an opening in the bottom thereof, a cake conveyor, and means for immersing said conveyor beneath the level of the icing in said pan.

4. In a machine of the class described, a dipping pan, a conveyor for conducting cakes to and from said pan, a receiving element for receiving the cakes from said conveyor, means for delivering the cakes from said conveyor to said receiving element in inverted position comprising an oscillating shaft provided with a plurality of radial blades, means for oscillating the shaft, and means for adjusting the angular position of said blades upon said shaft to set said blades relative to said conveyor and receiving element.

5. In a machine of the class described, a dipping pan having a channel formed in the bottom thereof, a feed pipe communicating with the interior of said pan through said channel, and means for controlling the admission of the icing from said channel to provide a substantially uniform distribution in said pan.

6. In a machine of the class described, an elongated dipping pan having a channel formed in the bottom wall and extending longitudinally thereof, a feed pipe opening into said channel, and adjustable means for regulating the flow of icing from said channel into said pan to maintain a substantially uniform distribution of the icing in said pan.

7. In a machine of the class described, a dipping pan, a feed pipe communicating with said pan adjacent to the bottom thereof, and adjustable members in said pan above the mouth of said pipe to provide a substantially uniform distribution of the icing in said pan.

8. In a machine of the class described, a dipping pan having a feed passage in one wall communicating with the interior thereof, a feed pipe having one end in registration with the outer end of said feed passage, and a clamp for retaining said pipe in said registration.

9. In a machine of the class described, an icing pan, a vertically movable supporting frame for said pan having a feed passage therein adapted to register with a corresponding passage in the wall of said pan, and means for securing said pan on said frame with said passages in registration.

10. In a machine of the class described, an icing pan, a vertically reciprocating supporting frame for said pan having a feed passage therein adapted to register with a corresponding passage in the wall of said pan, an icing reservoir, a flexible feed pipe connecting said reservoir with the passage in said frame, and means for securing said pan on said frame with said passages in registration.

11. In a machine of the class described, an icing pan, a vertically reciprocating supporting frame for said pan, an icing reservoir, a feed pipe connecting said reservoir with said pan, means for controlling the flow of icing in said pipe to control the depth of the icing in said pan, and means for returning surplus icing to said reservoir.

12. In a machine of the class described, a base, a dipping pan, and a conveyor mounted on said base for conducting the cakes to and from said pan comprising a pair of parallel revoluble shafts, a pulley on one of said shafts having a plurality of parallel peripheral grooves therein, a plurality of disk pulleys on the other of said shafts, one being disposed opposite each of the grooves in the first mentioned pulley, and an endless belt operating in each of said grooves and the disk pulley opposite thereto, said conveyor being adapted to be lifted from the base enmasse.

13. In a machine of the class described, a base, a dipping pan, and a conveyor unit mounted on said base for conducting the cakes to and from said pan, comprising a pair of parallel revoluble shafts, a pulley on one of said shafts having a plurality of parallel peripheral grooves therein, a plurality of disk pulleys on the other of said shafts, one being disposed opposite each of the grooves in the first mentioned pulley, an endless belt operating in each of said grooves and the disk pulley opposite thereto, and spacing members interposed between said disk pulleys, said conveyor unit being separable en masse from said base.

14. In a machine of the class described, the combination with icing mechanism including a base, a cake conveyor unit mounted on said base and separable en masse therefrom, comprising a pair of parallel revoluble shafts, a pulley on one of said shafts having a plurality of parallel peripheral grooves therein, a plurality of peripherally grooved disk pulleys on the other of said shafts, one being disposed opposite each of the grooves in the first mentioned pulley, an endless belt operating in each of said grooves and the disk pulley opposite thereto, and spacing members interposed between said disk pulleys.

15. In a machine of the class described, an icing mechanism, a conveyor for conveying cakes to said icing mechanism, and a feeding mechanism for feeding the cakes to said conveyor, said feeding mechanism including a relatively fixed plate projecting over a portion of said conveyor, means for relatively raising or lowering said plate with respect to the conveyor and means for adjusting said plate longitudinally of the conveyor.

16. In a machine of the class described, a vertically reciprocating supporting frame, an icing pan mounted on said frame, a conveyor for conducting the cakes to and from said pan, and adjustable means including a gear train for imparting an intermittent advance to said conveyor, said adjustable means being operable to adjust the advance of said conveyor.

17. In a machine of the class described, a vertically reciprocating supporting frame, an icing pan mounted on said frame, a conveyor for conducting the cakes to and from said pan, means for imparting an intermittent advance to said conveyor, and means including a gear train having therein an adjustable segmental gear for predetermining the extent of travel of said conveyor at each advance thereof comprising a member adapted to be oscillated and means for adjusting the degree of oscillation.

18. In a machine of the class described, a base, an icing mechanism including a conveyor mounted on said base, feed mechanism also mounted on said base and comprising a lower frame, a series of alternately arranged an upper frame hingedly mounted on said lower frame, a series of laternately arranged relatively stationary, and reciprocating steps on said upper frame, a horizontally adjustable stationary step on said lower frame to receive the cakes from the steps on the upper frame, means for discharging the cakes from said adjustable step on to said conveyor, and means for raising or lowering the free end of said lower frame to correspondingly adjust the position of said stationary step relative to said conveyor.

19. In a machine of the class described, the combination with icing mechanism, of a conveyor for discharging the iced cakes therefrom, and a second conveyor below the first for conducting trays into which the cakes will be delivered by the first mentioned conveyor, both of said conveyors being a portion of the same endless carrier.

20. In a machine of the class described, the combination with icing mechanism, of an endless discharge belt having one portion thereof folded back substantially upon itself to form two conveyors disposed one above the other, and operating in substantially the same direction, the lower conveyor being adapted to conduct trays beneath the outer end of the upper to receive the cakes discharged therefrom, and pulleys for actuating and guiding said belt.

21. In a machine of the class described, the combination with icing mechanism, of an endless discharge belt having one portion thereof folded back substantially upon itself to form two conveyors disposed one above the other, and acting substantially in the same direction, the lower conveyor being adapted to conduct drying boards beneath the outer end of the upper to receive the cakes discharged therefrom, means for varying the relative positions of said conveyors, and pulleys for actuating and guiding said belt.

22. In a machine of the class described, icing mechanism, and discharging mechanism for conducting the cakes from said icing mechanism, including an endless belt having one portion thereof folded back substantially upon itself to form two conveyors operating in substantially the same direction and disposed one above the other, the lower conveyor being adapted to conduct a succession of drying boards beneath the outer end of the upper conveyor to receive the cakes discharged therefrom, means for varying the angular relation of said conveyors, and pulleys for actuating and guiding said belt.

23. In a machine of the class described, the combination with icing mechanism, of a conveyor belt folded back substantially upon itself for discharging the iced cakes, and an angularly adjustable member extending substantially transversely of said belt for truing the same.

24. In a machine of the class described, the combination with icing mechanism, of an endless discharge belt having one portion thereof folded back substantially upon itself to form two conveyors disposed one above the other and operating in substantially the same direction, and means for actuating and guiding said belt including an angularly adjustable guiding member extending substantially transversely of said belt for truing the same.

25. In a machine of the class described, an icing pan, an icing reservoir, a feed pipe for conducting icing from said reservoir to said pan, and means consisting of two adjustable diverging plates for providing a uniform distribution in said pan of the icing entering from said feed pipe.

26. In a machine of the class described, a dipping pan, a multi-thread conveyor for conducting cakes to and from said dipping pan, means for imparting step by step movement to said conveyor, a discharging conveyor for receiving the cakes from the first conveyor, and cam and spring operated means operating in timed relation with said first conveyor for lifting the cakes therefrom and placing them in an inverted position on said discharging conveyor including serrated blades disposed between the threads of the first mentioned conveyor, and means for simultaneously oscillating the blades between the first-mentioned conveyor and the discharge conveyor, and means for adjusting the angular position of the blades about the center of oscillation thereof to set the blades with respect to the conveyors.

27. In a machine of the class described, the combination of a supporting frame, a unitary conveyor removably mounted on said frame, means for driving said conveyor comprising a gear carried by said unitary conveyor and another gear rotatably mounted on said supporting frame, said gears being intermeshed in driving engagement when said conveyor is mounted in operative position on said frame and said gears being readily disengageable as an incident to the removal of the conveyor from the frame, whereby removal of the conveyor is facilitated.

28. In a machine of the class described, the combination of a supporting frame, a unitary conveyor removably mounted on said frame, means for driving said conveyor comprising a pair of rotatable members carried respectively by said frame and conveyor, said pair of members being adapted to engage each other for driving said conveyor when the latter is mounted in operative position on the frame, and said members being capable of being readily disengaged for facilitating removal of the conveyor from the frame.

FREDERICK WESTERMAN.